March 1, 1938.  W. O. HAMPTON  2,109,919
POWER CONTROL MEANS
Filed June 3, 1936  4 Sheets-Sheet 1

Inventor:
Weldon O. Hampton
By
Atty.

March 1, 1938. W. O. HAMPTON 2,109,919
POWER CONTROL MEANS
Filed June 3, 1936 4 Sheets-Sheet 2
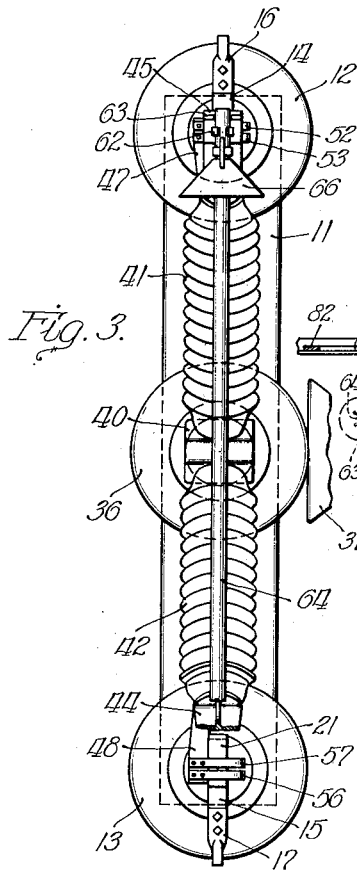
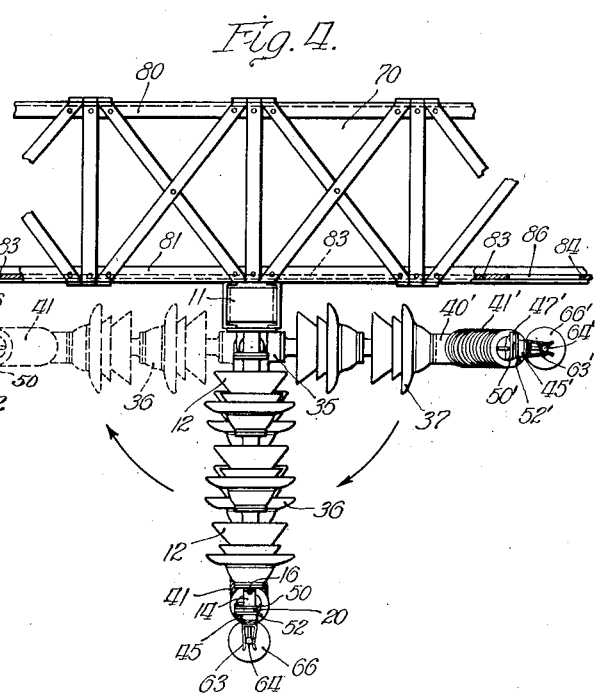
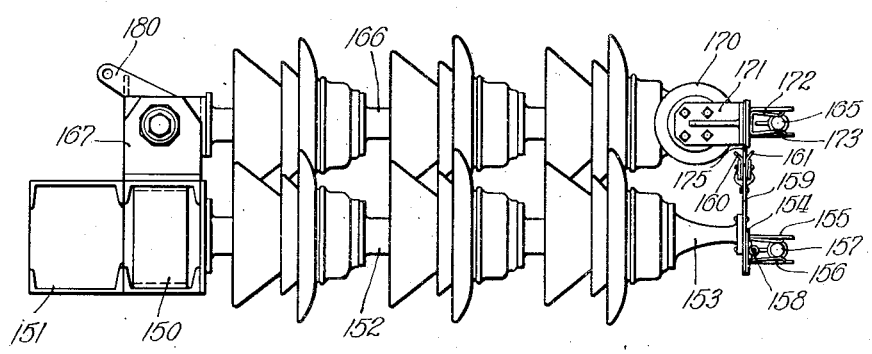
Inventor:
Weldon O. Hampton
By: [signature]
Atty.

March 1, 1938.  W. O. HAMPTON  2,109,919
POWER CONTROL MEANS
Filed June 3, 1936  4 Sheets-Sheet 3

Inventor:
Weldon O. Hampton
By:
Atty.

March 1, 1938.    W. O. HAMPTON    2,109,919
POWER CONTROL MEANS
Filed June 3, 1936    4 Sheets-Sheet 4
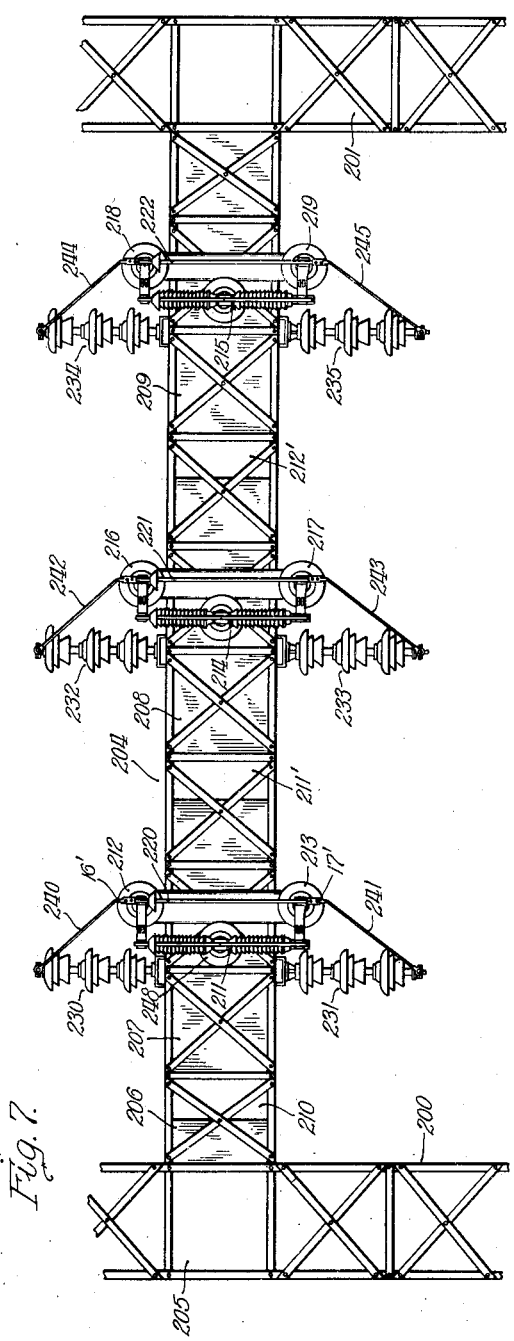
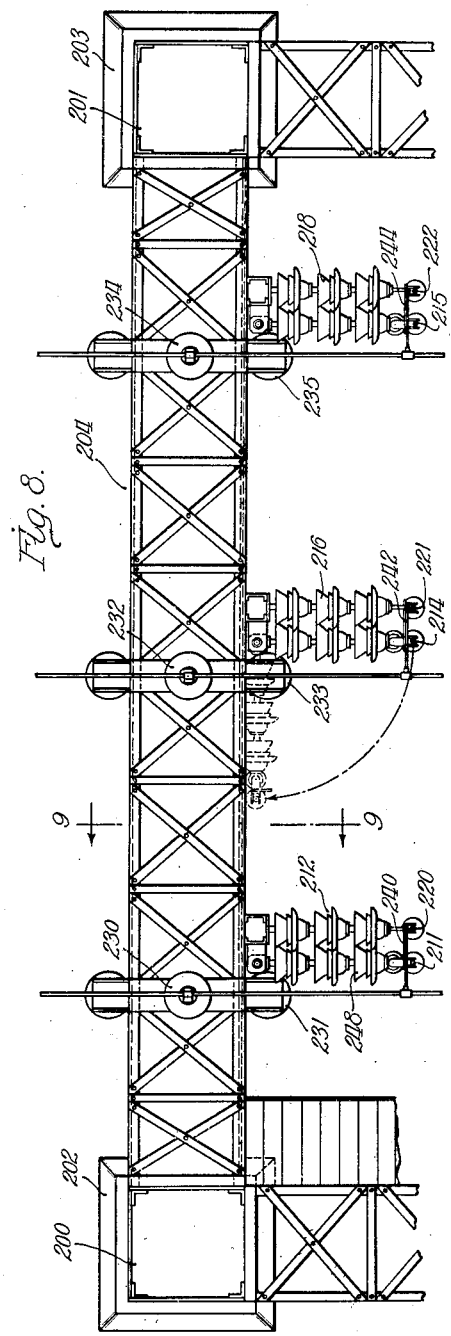
Inventor:
Weldon O. Hampton
By: [signature]
Atty.

Patented Mar. 1, 1938

2,109,919

UNITED STATES PATENT OFFICE 2,109,919

POWER CONTROL MEANS

Weldon O. Hampton, Chicago, Ill., assignor to Delta-Star Electric Company, Chicago, Ill., a corporation of Illinois Application June 3, 1936, Serial No. 83,215

19 Claims. (Cl. 200—125)

This invention relates generally to electric power control means, and is particularly concerned with a new and improved remote controlled disconnecting type fuse mounting.

Power lines, at predetermined points, e. g., at terminal or supply points, are connected to fuse devices which are mounted together with other control and supply equipment on the customary truss and girder structures. These structures are frequently considerably high and the fuse devices may be placed in more or less inaccessible and relatively crowded positions. The replacement of such a fuse and restoration of normal service conditions, for example, subsequent to an overload condition, is therefore usually attended with difficulties and may consume considerable time.

Repeater type fuses are known and in service where relatively low voltage conditions prevail. Such fuses are, however, impractical in the case of tensions exceeding certain magnitudes, for example, exceeding about 69,000 volts, and the replacement of fuses in high tension installations is, accordingly, carried out manually without the help of any particular control or operating provisions. It will be seen that these conditions present a considerable problem particularly when bearing in mind the fact that such fuses may be several feet long and may weigh many pounds. The task of moving such a fuse to a location, in some cases thirty and more feet above the ground within the truss and girder framework of the supporting structure, and placing it in proper position, is quite difficult, and, aside from consuming time and labor, exposes the maintenance personnel to dangers that may result in injuries.

These drawbacks are obviated by my invention. I provide a unitary fuse device comprising a service fuse which is normally in operation, together with an emergency or reserve fuse which may be switched into the corresponding circuit and may replace the previously mentioned service fuse whenever desired or required. One embodiment of my invention provides for a structure wherein the service fuse is disconnected at the time when the reserve fuse is connected in the corresponding circuit. In another embodiment, the service fuse may be mounted on a stationary support and the reserve fuse may be carried by a movable support. In this latter structure, the reserve fuse may be switched into the circuit without at the same time removing the service fuse which is out of commission. The reserve or emergency fuse, or rather, its movable support, may be actuated in another embodiment by remote control from the ground or, generally, from any desired point, by means of suitable governing and actuating mechanisms. The difficulties noted above with reference to customary fuse mountings are eliminated. The operation of switching the reserve fuse into service is accomplished quickly and safely. If a fuse has to be replaced, this can be done at any desired time. In order to make such replacement operation safer, I have also provided a shielded walk- or passageway within the truss structure in order to protect the maintenance and supervising personnel. Each fuse unit is accessible through openings in the wall of the shielded passageway.

My invention is particularly applicable in installations where higher voltages are used and where existing repeater type fuses are impractical. The advantages resulting from my invention will be particularly pronounced in the case of installations having high supporting structures with fuses disposed in more or less inaccessible or crowded locations.

My invention also furnishes the possibility of dispensing, under certain circumstances, with the use of expensive oil circuit breakers. Such devices would be ordinarily required in all cases where current is drawn from a high tension line, generally speaking, regardless of the amount of current required. Industrial plants or communities drawing power from a high tension line are examples of such service. The circuit breaker is, however, strictly speaking, merely a device designed to normally maintain conductive connection between the high tension line and the corresponding current-receiving equipment, and adapted to interrupt this connection responsive to an overload or like condition that may be detrimental to the equipment. The circuit breaker is again switched into the circuit after the emergency condition has passed. It will be seen that my new fuse device and its operation, as previously intimated, is in functional respects somewhat similar to that of a circuit breaker. As a matter of fact, it can take its place and will perform its functions satisfactorily in installations of relatively small or moderate size and of moderate current requirements.

Some of the salient objects and features of my invention may be specifically stated as follows:

The principal object is concerned with the provision of a novel fuse mounting device comprising a normal service fuse and support therefor and an emergency or reserve fuse with a support, together with remotely controlled means for switching the emergency fuse into the corresponding circuit whenever required, for example, whenever the normal service fuse is out of commission.

Another object is realized by the provision of a unitary fuse mounting structure comprising a normal service fuse and an emergency fuse and supports for each, in such a manner, that they form a unit mounted on a common base, one fuse being movable with respect to the other and operable by means of a suitable control device.

A further object of the invention receives expression in a unitary fuse device structure wherein the supports carrying the normal and the reserve or emergency fuses are mounted at an angle to each other, for example, at an angle of 90°, and operated so that one fuse is in operation while the other fuse is in reserve.

Still another object is concerned with an arrangement of a compact fuse unit wherein the two fuse-carrying means or supports are mounted on a common bearing or shaft and wherein the fuses with their supporting means can be rotated angularly out of alignment with contact means connecting with a service circuit or line.

Another object resides in mounting the unitary fuse device or devices within the supporting truss and girder structure so that they are easily accessible from an overhead walkway or passageway provided for the inspection and maintenance personnel.

A further object is realized by the provision of a metallic sheathing for the box girder alongside the fuse device to prevent injury to maintenance and supervising personnel passing through or along the walkway, together with openings in the sheathing for ready access to the fuse devices. A defective fuse may thus be replaced at any desired time; the workmen passing along the corresponding walkway will be protected against any arc which may occur incident to the blowing of an adjacent fuse; and the fuse device to be attended to is easily and safely reached for inspection, repair, or replacement.

Still another object has to do with the control provisions for operating the new fuse devices. The fuse devices may be connected to motor mechanisms mounted in the supporting truss structure or may be linked with a lever system terminating near the ground and operated by suitable manual or automatic devices, or by both.

Objects and features not specifically noted above will appear as the detailed description progresses, which is rendered below with reference to the drawings forming a part of this specification. In these drawings:

Fig. 1 is a side view of a preferred embodiment of a unitary fuse device of my invention comprising, two stationary contact-carrying insulating columns or stacks with terminal lugs for establishing connection with a line, and two rotatable stacks, each carrying a fuse, disposed at an angle of 90°, whereby one or the other fuse may be selectively connected with the line responsive to actuating the rotatable stacks;

Fig. 3 shows an elevation of the structure represented in Figs. 1 and 2 in the same operating positions as indicated in Fig. 2;

Fig. 4 is a top view of the device shown in Figs. 1, 2 and 3 with part of the truss structure on which it is mounted, showing in full lines one operating position and indicating in dotted lines the alternate position of the fuse stacks;

Fig. 5 represents another embodiment of my invention wherein the service fuse is mounted stationary and the reserve fuse rotatably;

Figs. 7, 8 and 9 represent three different views of a high tension installation in which my invention is incorporated so as to show the location of the fuse devices and certain other features which will appear as the detailed description progresses.

Like parts are generally designated in the drawings by like reference numerals. Only those parts and details will be specifically described and explained which have a direct bearing on the present invention.

Figure 1:
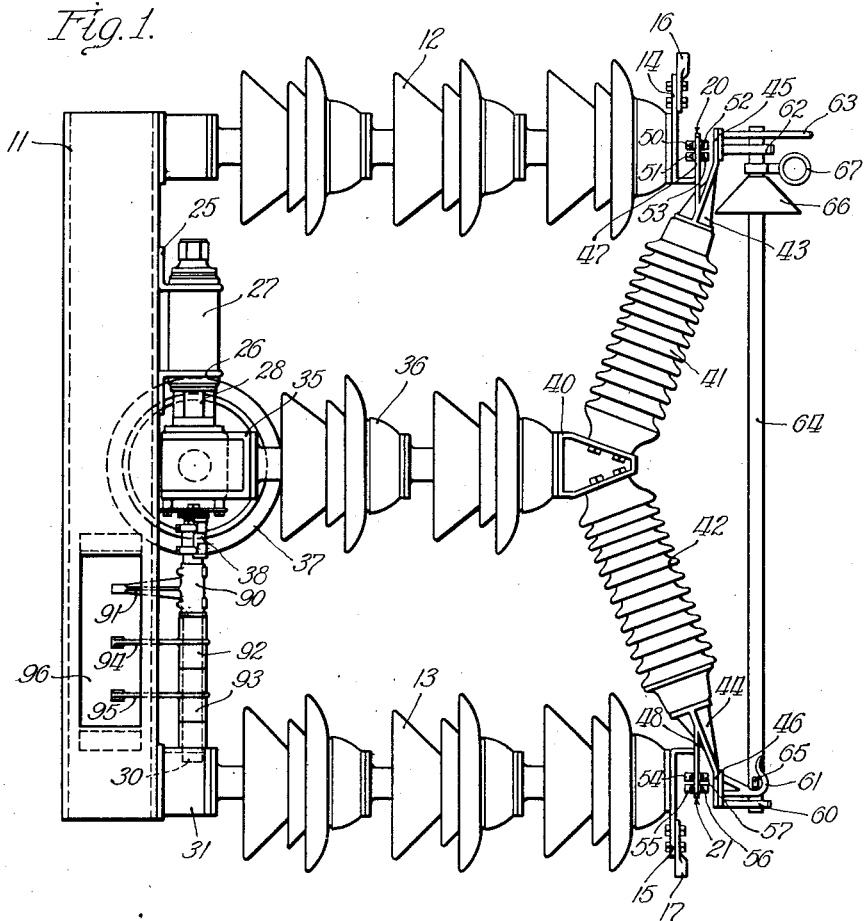

Referring, now, particularly to the embodiment shown in Figs. 1, 2, 3 and 4, reference numeral 11 indicates generally a base which is secured to the truss structure, as is particularly shown in Fig. 4. This base supports at each end a stationary insulating column or stack, such as shown at 12 and 13, projecting therefrom, each carrying at the end thereof contact members, such as shown at 14 and 15. Secured to these members are terminals, such as 16—17, respectively, to which may be connected the corresponding line conductors. (The manner in which the line conductors are connected to the terminals in an actual installation is particularly shown in Fig. 9 in connection with the terminals indicated at 16' and 17', to which are connected the connectors 240 and 241 leading to the line conductors 246 and 247.) Each of the contact members 14 and 15 consists of a generally U-shaped metallic strip having a longer lower and a shorter upper leg. The upper legs are designated in the drawings by the numerals 20 and 21, respectively, and these upper legs represent the contacts proper which are thus rigidly secured to the stationary insulating stacks 12 and 13, respectively. It will be realized that, if a line is connected to the terminal members 16 and 17, all that is necessary in order to provide for a conductive fuse connection across the line will be to connect a fuse conductively to the contact members 14 and 15, respectively. This connection is in practice established by means of the contact members 20 and 21 in a manner which will presently appear.

Secured to the base 11 are suitable brackets 25—26 supporting a ball thrust bearing 27. The shaft 28 of this thrust bearing extends, as is particularly shown in Fig. 1, downwardly, and the support 35 is keyed to it. Mounted on this support 35, which is thus rotatable, are the fuse-carrying stacks 36 and 37. A portion of the shaft extends downwardly beyond the support 35 and terminates in a flexible coupling 38 from which extends an intermediate shaft 30 terminating in a bearing provided in the mounting 31 which carries the stationary stack 13. Numeral 90 indicates a bushing keyed to the intermediate shaft and having an operating arm 91. 92—94 and 93—95 are idler bushings having like arms for a purpose yet to be described. It is therefore clear that if the shaft 30 is rotated, e. g., responsive to an operative actuation of the arm 91 extending from the bushing 90, the rotation will be transmitted to the shaft 28 of the thrust bearing 27 through the flexible coupling 38, and the two stacks 36 and 37 will swing or rotate with respect to the stationary contact-carrying stacks 12 and 13.

Figure 2:
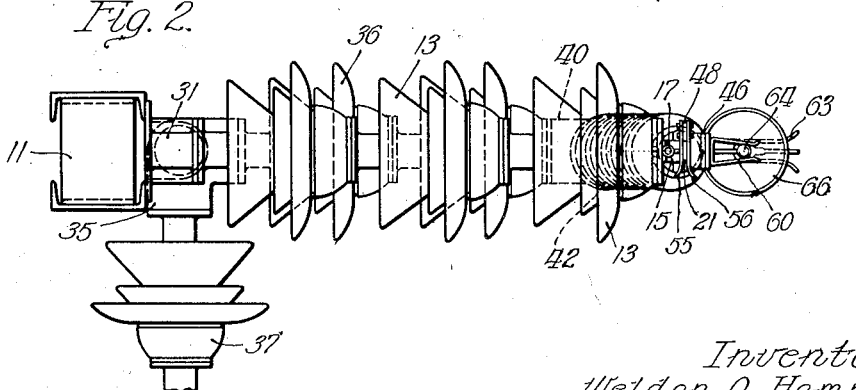
Fig. 2 illustrates an end view of the device looking at the structure from the bottom of Fig. 1, with one fuse stack in connect position and the other fuse stack broken away.

In Fig. 2, which is a view of the structure shown in Fig. 1 from the bottom thereof, or in Fig. 3, which is an elevational view, I have shown the stack 37 broken away, but it will appear clear, particularly from Fig. 4, that these rotatable stacks are disposed at an angle of 90°, and from Fig. 1 it appears clear that they are mounted on the common rotatable support 35 which is keyed to the shaft 28 of the ball thrust bearing 27.

Each of these rotatable stacks 36 and 37, which are disposed at an angle of 90° to each other and project from the base 11 substantially at the center thereof and between the stationary stacks 12 and 13, carries a bracket, such as 40, supporting a pair of insulators, such as 41—42, which project therefrom at an angle, as is particularly shown in Fig. 1. Mounted across the ends of the insulators 41 and 42 on each of the rotatable stacks 36—37 is a fuse and means adapted to engage the contacts on the stationary stacks when the corresponding rotatable stack is moved into connect position. This part of the structure is explained below.

Each insulator 41 and 42 carries at its end a mounting member, such as particularly shown in Fig. 1 at 43 and 44. These members carry the fuse mountings 45 and 46, and also the mountings for a pair of contact prongs or fingers indicated at 47 and 48. It will be seen, particularly from Fig. 3, that the supports for the fuse, numbered as 45 and 46, are axially in alignment with the rotatable stack 36, whereas the mountings 47 and 48 are slightly out of axial alignment with the stack, for reasons which will presently appear.

Secured to each of the carriers or supports 47 and 48 are double pairs of contact fingers or prongs, as shown in Fig. 1 at 50—53 and 54—57, respectively. These contact fingers or prongs will engage the corresponding rigid contacts 20 and 21, respectively, mounted on the stationary stacks 12 and 13 when the corresponding movable stack is rotated into operative position. Conductive relation will therefore be established between the line contacts 14 and 15 (to which are attached the terminals 16—17) and the contact fingers or prongs engaging these line contacts in operative position, and, inasmuch as the prongs or fingers are mounted in direct contact with the metallic supports 43 and 44, which in turn carry the fuse mounting supports 45 and 46, it will be understood that conductive relation will then also be established between the line contacts and fuse mounting supports 45 and 46. It will also be clear that similar contact fingers or prongs are provided in the same manner on the movable stack 37, which in Figs. 2 and 3 is broken away and in Fig. 4 is shown in full lines in inoperative position. The contact prongs or fingers carried by the movable stack 37 are indicated in Fig. 4 by the reference numerals 50' and 52'.

It will be seen from the above description that, inasmuch as each movable stack 36 and 37 carries two sets of contact prongs or fingers, it is possible to establish conductive relation between the contact prongs of each movable stack and the stationary contacts 20 and 21 carried by the stationary stacks 12 and 13. The connection is established simply by rotating the corresponding stack 36 or 37 into position until the corresponding contact prongs establish engagement with the stationary contacts.

In Fig. 4 I have shown the stack 36 in full lines in operated condition, that is, with its contact prongs 50—52 in engagement with the stationary contacts of the stationary stacks 12 and 13. The rotatable stack 37 is shown in Fig. 4 in full lines in inoperative position, that is, out of engagement with the stationary contacts 20 and 21. The alternate position of the rotatable stack 36 is also indicated in dotted lines.

Referring, now, particularly to the manner in which the fuses are removably mounted on the corresponding fuse carriers 45 and 46 of the rotatable stacks and pointing particularly to Fig. 1, it will be seen that the fuse carrier 46 is provided with a contact bracket 60 and with a forked mounting member 61, while the oppositely disposed fuse carrier 45 is provided with a companion contact bracket 62 and with a forked terminal member 63. The fuse 64 is provided at one end with a limit stop 65 and at the other end with a shield 66 and with a hook-like member 67. Generally speaking, any suitable type of fuse may be used. I am describing a specific type of fuse comprising, the fuse member 64 with its limit stop 65, its shield 66 and its operating member 67 merely for the sake of convenience. The fuse is removed from the structure simply by inserting a suitable hook carried on a pole into the member 67 and pulling the fuse out of contact with the contact prongs 62. The fuse is then lifted out of contact with the forked hook member 61, thereby lifting out the limit stop 65 and freeing the fuse entirely of contact with the fuse mountings. The insertion of a new fuse is likewise simple. It is merely necessary to insert the fuse first so that its lower end engages the contact member 60 and the limit stop 65 enters the member 61, and then press the opposite end of the fuse into position so that its upper end engages the contact member 62. The rotatable companion stack 37 carries a fuse of like construction mounted in the same manner as described above. Like parts of the fuse member and fuse mountings in connection with the rotatable stack 37 are indicated in Fig. 4 by the reference numerals 63', 64' and 66'.

As is particularly shown in Figs. 2 and 3, the fuse 64 is in alignment with the axis of the stationary stacks 12 and 13. The contact members 14 and 15 are also mounted on the stationary stacks in alignment with the axis thereof. The contact prongs or fingers which are carried on the movable stacks (together with the corresponding fuses) must be disposed so as to rotate toward the stationary contacts into engagement therewith. It is therefore necessary to carry the mountings, such as 47 and 48, for the contact prongs, somewhat out of the center line of the movable stacks so that the contact fingers or prongs will properly move into position and engage the stationary contacts 20 and 21.

In Fig. 4 I have shown a top view of the device in position on the truss structure, generally indicated by numeral 70. The base 11 is directly mounted on the truss structure, as shown, and the stationary stacks 12 and 13 project from the truss structure and carry the stationary contacts 20 and 21, and the movable stacks 36 and 37 are rotatably mounted on the common thrust bearing 27, as previously described. The stack 36 is shown in connected or operative position with its prongs 50 and 52 engaging the stationary contact 20 on the stack 12. Like prongs engage the oppositely located contact 21 on the stack 13 which is not visible in Fig. 4. The rotatable stack 37 is shown in inoperative position, that is, out of contact with the stationary contacts on the stationary stacks. The stack 36 is also shown in dotted lines in inoperative position. The arrow at the left of the centrally shown stacks indicates the direction of the disengaging motion or rotation of the stack 36, and if the stack 36 is moved into disconnect position, then the stack 37 will be moved into the connect position in a direction indicated by the arrow in Fig. 4 at the right of the centrally shown stacks. The contact fingers 50 and 52 of the movable stack 36 are shown in engagement with the stationary contact 20 carried by the stack 12 and on the other side corresponding contact prongs or fingers will be likewise in engagement with the stationary contact 21 carried by the stack 13. The prongs of the movable stack 37 (such as 50'—52') are out of engagement with the stationary contacts of the structure, but will establish engagement therewith when the stack 37 is moved into connect position in the direction of the arrow, while the stack 36 will be disconnected at that time and will move into its disconnect position shown in dotted lines.

Again referring to Fig. 4, I wish to call attention to the shielding structure which I have provided for the safety of the supervising and maintenance personnel. The space between the truss members 80 and 81 represents the passage or walkway of the truss structure as seen from above. Members 80 and 81 are angular pieces and to the inside thereof are secured the shields 82, 83 and 84. The angular member 81 is shown broken away to illustrate portions of the shields 82, 83 and 84. Openings between the various shield sections are provided, as indicated at 85 and 86. These openings, it will be seen, are located at the points where the fuse members carried by the rotatable stacks will be positioned when the fuse members are rotated into disconnect position.

Assuming, for example, that the fuse member 64 carried by the rotatable stack 36 is connected to the line, that is, to the line contacts 20 and 21 of the device as shown in Fig. 1, and further assuming that this fuse 64 becomes inoperative, necessitating connection of the reserve or emergency fuse 64' carried by the movable stack 37, it will be clear that the service can be reestablished quickly and safely simply by rotating the damaged fuse 64 carried by the movable stack 36 out of contact with the line contacts and into the position shown in dotted lines in Fig. 4, while at the same time rotating the emergency fuse 64' carried by the rotatable companion stack 37 from its disconnect position into connect position. The fuse 64, which is now out of commission, will be in alignment with the opening 85 in the shielding structure of the walkway.

The maintenance personnel can replace the fuse 64 easily by carrying the fuse up the truss structure to the opening 86 in the shield and removing the fuse 64 and replacing it with another fuse. The operation is safe and can be carried out at any convenient time. The proper service condition can thus be restored very quickly and without any danger of hazard to the maintenance personnel. The shielding also affords protection for the maintenance personnel against any arc which may occur due to the blowing of one or the other fuse while maintenance men pass along the walkway. After replacing the damaged fuse 64 through the opening 85 in the shielding of the walkway, this fuse will take the place of an emergency or reserve fuse, while the fuse 64' carried by the movable stack 37 is in connect position. Should the fuse 64' carried by the stack 37 go out of commission, then the reverse operation will take place, namely, the stack 37 will be moved into its disconnect position, while the stack 36 with its fuse 64 will be moved into operative position, as is shown, for example, in Figs. 1, 2 and 3.

I will now describe the manner in which fuse devices, such as explained above and shown in Figs. 1 to 4, inclusive, are actuated.

Secured to each fuse device and particularly secured to each operating shaft, such as 28, (Fig. 1), connected to the thrust ball bearing 27, is the previously mentioned bushing 90 which is keyed to the shaft 30 cooperating with the flexible coupling 38. The bushing 90 is a casting carrying an actuating arm 91. To this arm is connected an operating mechanism of a structure, such as I will presently describe, or the arm may be rotated from a gear box or the like so as to effect selective connection or disconnection, as the case may be, of the fuses in the manner explained above. The bushings 92 and 93 with their arms 94 and 95 are idler bushings connected with the mechanisms operating other fuse devices. In order to dispose the corresponding operating members properly and to establish the connection thereof with the operating arms 91, 94 and 95, I have provided an opening 96 in the base 11, as shown particularly in Fig. 1.

Figure 6:
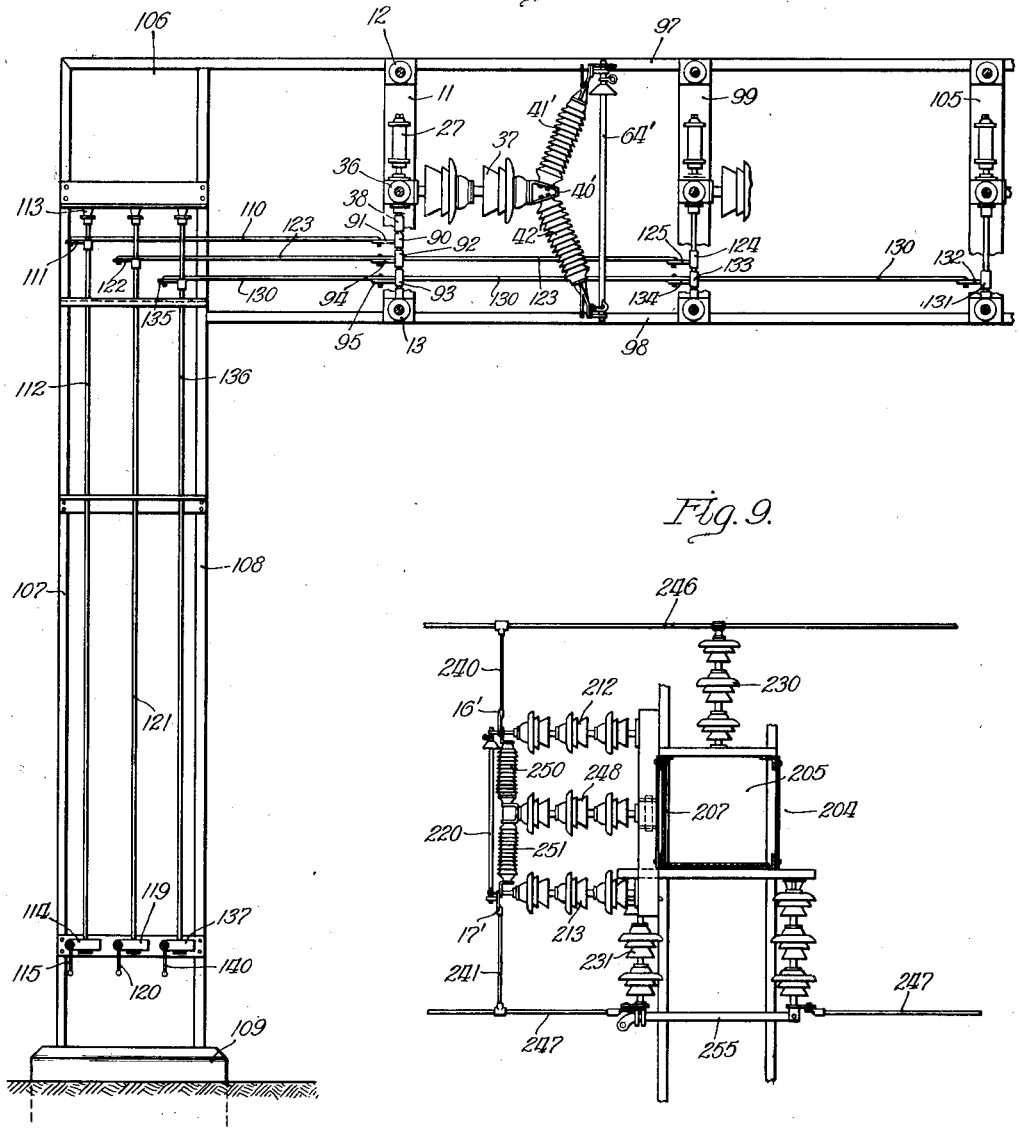
Fig. 6 illustrates diagrammatically one embodiment of the mechanisms for controlling the fuse devices mounted on a truss structure.

Referring, now, to Fig. 6, I have shown in this figure in a diagrammatic way part of a horizontally disposed truss structure comprising the members 97 and 98 carrying the fuse mounting base members 11, 99 and 105. The base may in each instance correspond to the base 11 shown in Figs. 1 to 4, inclusive. Accordingly, I have indicated in Fig. 6, in connection with the base 11, the stationary stacks 12 and 13 and in a like diagrammatic manner the stacks 36 and 37. Similar structures are, of course, mounted on the base members 99 and 105. Numeral 27, again, indicates the ball thrust bearing of the unit mounted on base 11; numeral 38 indicates the flexible coupling; and 90 indicates the bushing provided with the operating arm 91, all as shown more in detail in Fig. 1. 92 and 93 are the idler bushings carrying the arms 94 and 95. Numeral 106 indicates part of the passage or walkway in section, and the whole is supported by the girder structure comprising the upright column members 107—108 which are placed on suitable foundations, such, for example, as indicated at numeral 109. The operating mechanism for the fuse units is described below.

A connecting rod 110 is joined with the arm 91 of the bushing 90. It terminates in an arm 111 which is mounted on a rotatable upright rod 112. The latter is mounted at the top in a bearing 113 and at the bottom it may terminate in a gear box or in a suitable operating mechanism, as indicated at 114. The mechanism 114 may or may not contain motor control or gear transmissions, as the case may be, and as will be decided by local conditions. An operating member 115, which may be a suitable handle or crank, is connected to the mechanism 114 and when this member 115 is actuated the connecting rod 112 will rotate in its bearings 113 and in a companion bearing provided in the box 114, and will thereby rotate the lever arm 111 and move the connecting rod 110 in the corresponding direction. Accordingly, inasmuch as the connecting rod 110 is also connected to the lever arm 91 of the bushing 90, which in turn is keyed to the operating shaft and to the flexible coupling 38 of the fuse unit mounted on the base 11, it will be clear that, responsive to the actuation of the crank or lever or operating member 115, a rotation of the movable or rotatable fuse mounted on the base 11 will be effected. Should that fuse of the unit mounted on base 11, which is operatively connected to the line, go out of commission, then it will merely be necessary to actuate the operating member 115 and to rotate the emergency or reserve fuse into connect position, as previously described.

The fuse unit mounted on the base 99 will be actuated in a like manner from a remotely located actuating member, such as 120, provided on a like gear box or other suitable mechanism 119, causing the rotation of the connecting rod 121, which in turn is connected by means of the arm 122 to a connecting rod 123. This connecting rod 123 is also connected to the arm 94 of the idler bushing 92 on the first fuse unit. From there it extends to the second fuse unit mounted on the base 99 and at that place engages an arm 125 of an operating bushing 124 which corresponds to the operating bushing 90 of the fuse unit mounted on base 11. The third fuse unit, mounted on base 105, may be actuated in the same manner by means of an operating rod 130 which is connected to the arm 132 of an operating bushing 131. Rod 130 connects with the arm 134 of an idler bushing 133 provided on the fuse unit mounted on base 99 and connects also with the arm 95 of the idler bushing 93 on the fuse unit carried on base 11. It finally terminates in the arm 135 connected to the rotatable rod or tube 136 which is mounted like the operating members 112 and 121 and terminates in the actuating mechanism 137 having a handle or crank similar to the other mechanism.

It is understood, of course, that the operating mechanisms shown diagrammatically at 114, 119 and 137 may be gear boxes manually operated by means of the cranks 115, 120 and 140, respectively, or the operation may be motor-controlled. It is also possible to provide individual motor control in conjunction with each fuse unit and to actuate the various motors whenever desired or necessary, by means of suitable remotely controlled circuits.

It will be seen from the above description that the principal object of my invention is realized, namely, the object of providing a fuse device carrying a plurality of fuses, one of which is normally connected in a service circuit, together with remote controlled means for actuating the fuse device whereby another fuse member may be connected to take the place of the first fuse member. Stating the invention in other appropriate terms, I have provided a unit carrying a plurality of fuse members, and remote controlled means for selectively connecting said fuse members in a circuit.

The invention explained so far, with reference to the fuse unit itself may, of course, be realized in a different manner from the one shown in Figs. 1–4. For example, it may be realized in a manner as is shown in Fig. 5, wherein I have illustrated a side view of a modified embodiment. Only one view of this modification is shown, but it is believed that it will be understood when bearing in mind the remarks made previously with reference to the first described preferred structure.

Referring, now, to Fig. 5 which is an end view of a modified structure, numeral 150 indicates a base which may be secured to a truss structure at 151. This base supports two stationary stacks 152, each carrying a connecting member at its end, as indicated at 153. This connecting member carries a fuse mounting 154 comprising the forked contact members 155—156 which support the stationary fuse 157. Numeral 158 indicates a terminal lug to which may be connected a line. There are, of course, two such lugs, one at each end of the structure, each connected on the corresponding stationary stack in a manner such as shown, for example, in Fig. 1 with reference to the stacks 12 and 13 and terminal lugs 16 and 17. The service fuse 157 is thus mounted on the stationary insulating stacks 152. Secured on the member 153 is also a contact-carrying part 159 supporting the prongs or fingers 160 and 161.

The emergency or reserve fuse 165 is supported by a separate stack 166 which is rotatably mounted in the bracket 167 attached to the base 150. There is only one such rotatable stack 166 mounted at 167, and its mounting is disposed on the side of the base 150 midway between the stationary stacks 152. On the top of the stack 166 is a connector from which project two branch insulators 170, one to each side, and these insulators carry at their ends connecting members, such as 171, each holding forked contact members 172 and 173 which carry the emergency fuse 165. (The structure of these branch insulators projecting from the stack 166 may be seen in Fig. 9, reference numerals 250—251). Each of the connecting members 171 also carries a knife or tongue contact 175 adapted to enter the contact prongs or fingers 160 and 161 provided on each of the stationary insulating stacks 152. It is thus possible to rotate the stack 166 with its branch insulators 170 in and out of engagement with the prong contacts 160 and 161. In Fig. 5 the emergency fuse 165 is shown to be connected in parallel with the service fuse 157. However, if the stack 166 is rotated away from the stationary stacks 152, then the knife contacts 175 will disengage the prong contacts 160 and 161, thereby removing the emergency or reserve fuse 165 from contact with the line lugs 158 and therefore from contact with the line. The rotation of the rotatable stack 166 is accomplished by means of an arm 180 which may be operated by a suitable lever arrangement, in a manner similar to the one previously described. The corresponding operating members are in this case so disposed as to project through the part 151 of the base 150.

Figure 9:
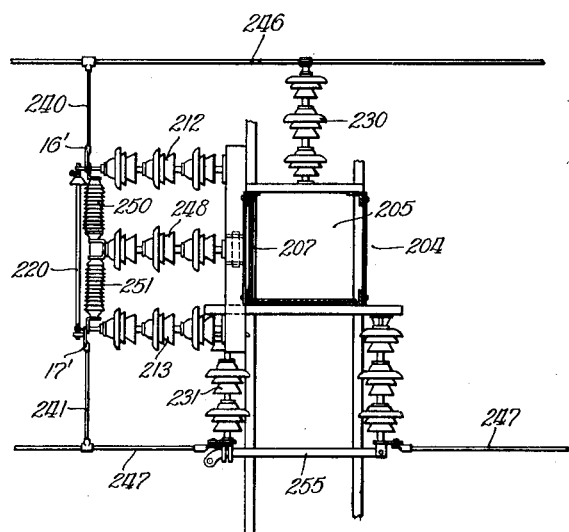

In Figs. 7, 8 and 9 I have shown part of an installation utilizing a fuse device of my invention, for example, the one shown in Fig. 5. Fig. 8 is a top view showing three fuse devices in operated position, that is, with the emergency fuses in their connect positions. The emergency fuse of one fuse device is shown in dotted lines in disconnect position. Fig. 7 is an elevational view looking directly at the fuse devices on the truss structure and toward the passage or walkway disposed in back of the fuse devices and provided with the openings whereby access may be easily gained to the fuse devices for repair and maintenance purposes. Fig. 9 is a view taken along line 9—9 in Fig. 8 and showing the passage or walkway and one of the fuse devices in side view.

Referring, now, to Figs. 7, 8 and 9, upright girders and truss supports, such as 200—201, are placed on suitable foundations 202—203 and rise from the ground supporting an overhead truss structure, generally indicated at 204, containing the passage or walkway 205. This walkway therefore extends in back of the fuse devices, as shown in Fig. 7. The passageway is shielded, as indicated at 206, 207, 208, 209, and contains openings 210, 211', 212'. The opening 210 is disposed so that the emergency fuse 211 will be placed directly in front of it when it is rotated out of engagement with the contacts carried by the stationary stacks 212—213 of the fuse unit shown at the left hand side of Figs. 7 and 8. The openings 211' and 212' are likewise disposed so that the reserve fuses 214 and 215, respectively, will be disposed directly in front of them when these reserve fuses are rotated out of engagement with the line terminal lugs carried on the stationary stacks 216—217 and 218—219 of the second and third fuse units. When these reserve fuses are thus rotated, for example, as shown in connection with the center unit in Fig. 8, into disconnect position, the alignment will be established with the respective opening, in the walkway shielding structure and the corresponding fuse can be easily attended to.

The service fuses in these structures are indicated at 220, 221 and 222, respectively. As already mentioned before, the fuse units shown in these figures may be of a structure such as described in connection with Fig. 5. The stacks 230—231, 232—233 and 234—235 support line conductors, and it will be seen, particularly from Fig. 7, that the terminal lugs on the stationary service fuse-carrying stacks 212—213, 216—217, and 218—219 are connected directly to the lines by means of conductors 240—241, 242—243, and 244—245.

It will be seen, particularly from Fig. 9, that the line 246—247 connects by means of the conductors 240—241 with the lugs 16' and 17' carried on the stationary stacks 212 and 213 mounted on the base which is directly attached to the walkway structure 205. The stationary stacks 212 and 213 correspond to the stationary stacks indicated by the numeral 152 in Fig. 5. The center stack 248 is rotatably mounted on the base with respect to the stationary stacks 212—213 and corresponds to the rotatable stack 166 in Fig. 5. At the end of the rotatable stack 248 are secured the branch insulators 250—251 which correspond to the branch insulator indicated in Fig. 5 at 170. At the end of these branch insulators are the knife contacts which engage the prong contacts on the stationary stacks 212 and 213, as previously described.

The line conductor 247 is secured to the insulating supporting stack 231, and the line conductor 246 is supported by the insulating stack 230, in accordance with the usual practice. However, connected in the lower line conductor 247, shown in Fig. 9, is a switch 255 of suitable construction, whereby the line circuit may be opened whenever desired.

The walkway 205, in Fig. 9, is shown to be shielded at 207, but this shielding contains the openings 210, 211' and 212', particularly indicated in Fig. 7, for the purpose of gaining access to the reserve fuses when they are in a disconnect position, as shown in connection with the center unit in Fig. 8. The service fuses can be replaced from a platform which extends along parallel to the walkway 205, and close enough so that the fuses can be reached and changed with an insulated stick such as is commonly used for this purpose.

Changes may be devised by those experienced in the art, but it is understood that all such changes will be considered my invention, provided that they are covered in the spirit and scope of the appended claims wherein I have defined what is new over the art.

I claim as my invention:

1. In combination with high tension power-transmitting equipment, a line, a service fuse normally connected with said line, a reserve fuse for emergency connection with said line, said fuses forming an operating unit in which said reserve fuse is angularly movable with respect to said service fuse, and remote controlled means for connecting said reserve fuse with said line, said means including link members extending from said reserve fuse and operable at a distance therefrom, whereby said reserve fuse may be moved to connect with said line in place of said service fuse.

2. A structure defined in claim 1, together with separate carrier means for said fuse members, wherein the carrier means for the service fuse member is stationary and the carrier means for the reserve fuse rotatable thereto.

3. In the art of transmitting electric power and particularly high tension current, an overhead truss structure comprising, a sheathed overhead walkway, an opening in the sheath of said walkway, a base secured near said opening, and a fuse device mounted on said base and accessible through said opening.

4. The structure defined in claim 3, wherein said fuse device comprises an angularly movable carrier supporting a fuse member, together with means for moving said carrier to position said fuse member in alignment with said opening.

5. The structure defined in claim 3, wherein said fuse device comprises a carrier supporting a fuse member, means for rotatably journalling said carrier on said base, and means for actuating said carrier to position said fuse member in alignment with said opening whereby access is gained thereto through said opening.

6. The structure defined in claim 3, wherein said fuse device comprises a service fuse member normally connected to a line terminating in said truss structure and a reserve fuse normally disposed adjacent the sheath of said walkway in alignment with the opening therein, together with remote controlled operating means for moving said reserve fuse to connect with said line in place of said service fuse.

7. The unitary structure of a fuse device having a normal service fuse and a reserve fuse comprising, a base, stationary insulating means projecting from said base near each end thereof, said service fuse being removably mounted on said insulating means, lugs carried by said insulating means for connecting a line thereto in conductive relation to said service fuse, other insulating means rotatably mounted on said base and projecting therefrom, said reserve fuse being removably mounted at the end of said other insulating means, cooperating contact means on said first and said second insulating means whereby said reserve fuse may be connected in conductive relation with said lugs and said line responsive to operative actuation of said rotatably mounted insulating means, and means on said rotatable insulating means whereby the operative rotation thereof may be effected to cause the operative connection of said reserve fuse.

8. A fuse unit particularly for a high tension power line comprising a base, stationary carrier means on said base supporting a service fuse connected to said line, a second carrier means movable relative to said first carrier means and supporting a reserve fuse for emergency connection to said line, and operating means connected with said second carrier means for actuating the same to connect said reserve fuse to said line.

9. In a fuse unit for a high tension line, a base, two spaced insulating stacks supported on said base, means at the ends of said two stacks, respectively, for terminating the two sections of a line, a third stack pivotally mounted on said base between said first and second stacks and normally extending parallel thereto, means including two additional stacks connected to the end of said third stack and extending in opposite directions therefrom for supporting a fuse in operative position to join said sections, and means for rotating said third stack on its pivot to angularly displace said third stack relative to said first and second stacks and thereby move said fuse out of operative position.

10. In a fuse unit for a high tension power line, a base, two spaced insulating stacks supported on said base, means at the ends of said two stacks, respectively, for terminating the two sections of a line, a shaft supported in bearings on said base, a third stack disposed between said first and second stacks and rigidly mounted on said shaft, insulating means carried on said third stack for supporting a fuse at the two opposite ends thereof, and means for rotating said shaft to move said third stack to either of two positions, in one of which the said fuse supported by the third stack is operative to connect the said line sections and in the other of which the fuse is inoperative to connect said sections.

11. In a fuse unit for a high tension power line, a base, two spaced insulating stacks supported on said base, means at the ends of said stacks, respectively, for terminating the two sections of a line, a shaft supported in bearings on said base, third and fourth stacks rigidly secured to said shaft at a point between said first and second stacks, said third and fourth stacks being angularly displaced around said shaft, means including two additional stacks secured to the end of said third stack and extending in opposite directions therefrom for supporting a fuse, two similarly disposed additional stacks secured to the end of the fourth stack for supporting a second fuse, and means for rotating said shaft to move either the third or fourth stack to such a position that the associated fuse is operative to connect said line sections together.

12. In a fuse unit for a high tension power line, a base, two spaced insulating stacks supported on said base, a switch member mounted on each stack together with means for connecting a line thereto, third and fourth stacks angularly displaced from each other and pivotally supported on said base between said first and second stacks, a pair of fuse supporting elements supported in spaced relation on the end of the third stack, a similar pair of fuse supporting elements supported on said fourth stack, two fuses mounted between said pairs of supporting elements, respectively, a pair of cooperating contact fingers conductively connected to each fuse supporting element, the two pairs of contact fingers which are associated with the third stack being normally in engagement with said switch members, respectively, to connect the same through the associated fuse, and means for simultaneously rotating the third and fourth stacks on their pivot to cause the contact fingers carried on the third stack to separate from said switch members and to bring the corresponding contact fingers carried on the fourth stack into engagement therewith, whereby said switch members are connected through the other fuse.

13. The combination with a high tension power line, of a supporting structure including a passageway, line terminals supported on one side of said structure, a fuse connecting said terminals, a protective sheathing separating said passageway from said terminals and fuse, said sheathing having an opening therein, and remotely controlled adjustable supporting means for said fuse whereby the same can be moved away from said terminals to a position adjacent said opening.

14. In a high tension power system, a supporting structure including a passageway, an insulating vertical wall extending along one side of said passageway, said wall having spaced openings therein, pairs of line terminals mounted on said structure outside said wall and opposite points between said openings, whereby a portion of the wall is normally interposed between the passageway and each pair of terminals, a fuse connecting each pair of line terminals, a pivoted support for each fuse, and remotely controlled means for actuating any support to move its associated fuse out of operative relation with its associated pair of line terminals, and to a position opposite an adjacent opening in said wall.

15. The combination, in a high tension power system, of an overhead supporting structure, horizontally disposed vertically spaced insulating stacks projecting from one side of said structure, two lines terminating on said stacks, respectively, two fuses adapted for use alternatively in connecting said lines, a passageway extending along said structure, a protective sheathing separating said passageway from said fuses, remotely controlled means for moving either fuse to operative position to connect said lines and simultaneously move the other fuse to inoperative position, and two openings in said sheathing associated with said fuses, respectively, and so positioned that movement of either fuse to inoperative position brings it adjacent its associated opening.

16. In combination, an overhead truss structure supported on vertical towers, a plurality of pairs of horizontally disposed vertically spaced insulated stacks projecting from one side of said structure, lines terminating on the opposite stacks of each pair, a pair of fuses for use alternatively in connecting each pair of lines, a rotatable shaft for each pair of fuses, horizontal links extending along said structure for independently operating said shafts, means including vertical rotatable shafts in one of said towers for operating said links, and means supporting each pair of fuses on its associated shaft in the proper position whereby rotation of any fuse shaft in opposite directions will bring the associated fuses successively into operative position.

17. In a fuse unit for a high tension line, spaced terminals for adjacent sections of said line mounted on insulated supports, a fuse conductively connecting said terminals, a second fuse, insulating means for supporting said second fuse with both ends thereof out of operative relation to the line, and means for moving said second fuse by moving said supporting means to connect said second fuse in the line in parallel with the said first fuse, whereby the first fuse can be changed without opening the line.

18. In a fuse unit for a high tension line, insulating stacks supported in spaced relation, a third stack extending parallel to said first two stacks but in a different plane, fourth and fifth stacks extending in opposite directions from the end of said third stack parallel to the plane of said first two stacks, line sections terminated on said first two stacks, respectively, switch members conductively connected to said line sections and extending laterally toward the plane of said third, fourth, and fifth stacks, a fuse supported on the free ends of said fourth and fifth stacks, switch members conductively connected to opposite ends of said fuse and engaged, respectively, by said first mentioned switch members, and means for rotating said third stack about an axis through the base thereof to disengage said switch members.

19. In a fuse unit for a high tension line, a base, two spaced insulating stacks rigidly mounted on said base, a terminal mounted on the end of each of said fixed stacks for terminating a line section, a fuse conductively connecting said terminals, a switch member mounted on each of said fixed stacks, said switch members being conductively connected to said terminals, respectively, and extending laterally therefrom to one side of the line of said fixed stacks, a lateral extension of said base, a third stack rotatably mounted on said extension, insulating means at the end of said third stack supporting a second fuse at opposite ends thereof, switch members conductively connected to the opposite ends of said second fuse and engaging the switch members supported on said fixed stacks, and means for rotating said third stack to disengage the switch members associated with the second fuse from the other switch members.

WELDON O. HAMPTON.